March 2, 1937. H. J. L. FRANK 2,072,585
RANGE RECEPTACLE
Filed June 17, 1935 3 Sheets-Sheet 1
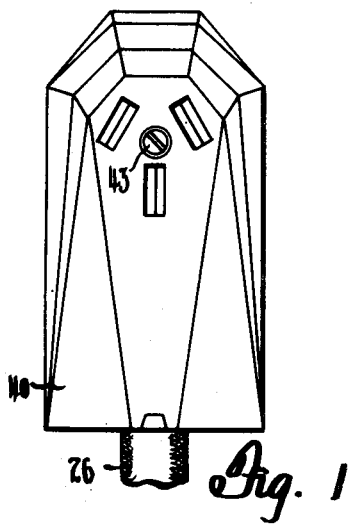
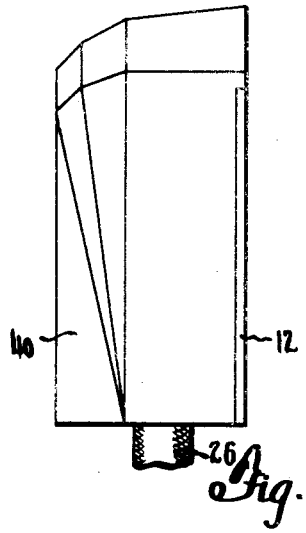
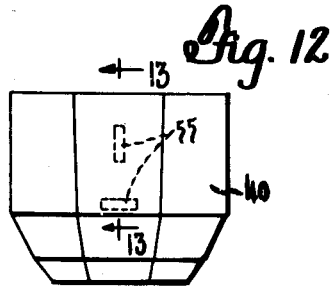
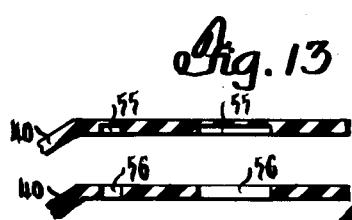
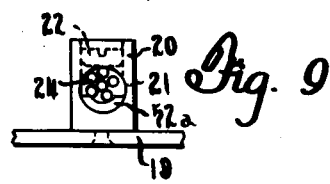
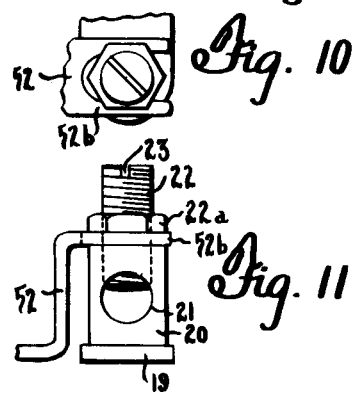
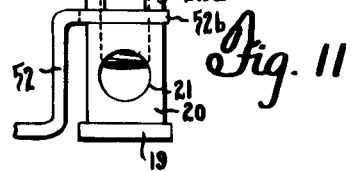
INVENTOR.
Harrison J L Frank
BY Daniel G Cullen
ATTORNEY.

March 2, 1937.   H. J. L. FRANK   2,072,585
RANGE RECEPTACLE
Filed June 17, 1935   3 Sheets-Sheet 2
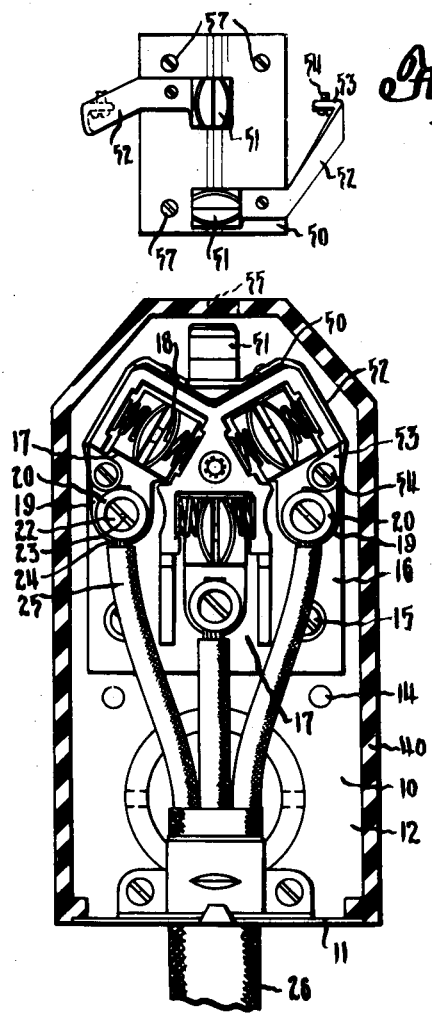
Fig. 3
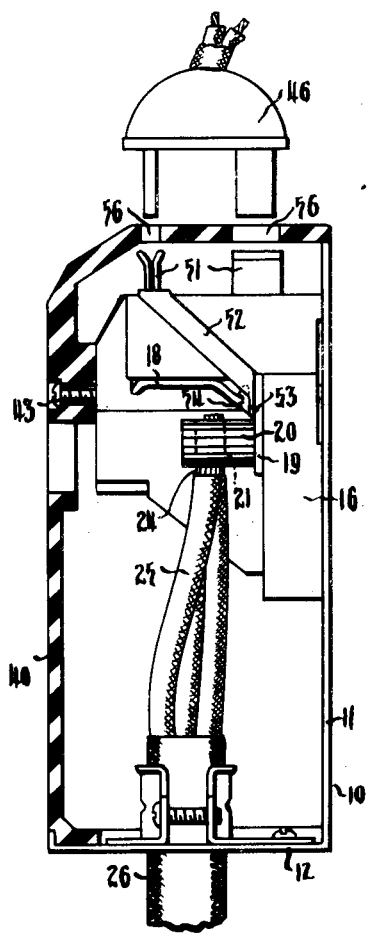
Fig. 4
Fig. 5
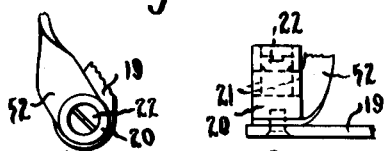
Fig. 6   Fig. 7
INVENTOR.
Harrison J L Frank
BY
Daniel Cullen
ATTORNEY.

March 2, 1937. H. J. L. FRANK 2,072,585
RANGE RECEPTACLE
Filed June 17, 1935 3 Sheets-Sheet 3
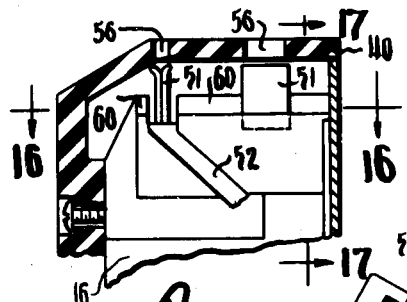
Fig. 15
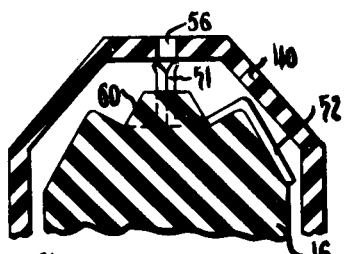
Fig. 17
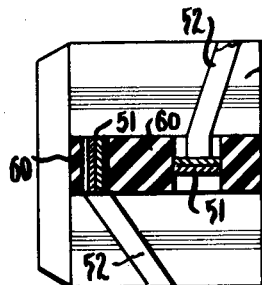
Fig. 16
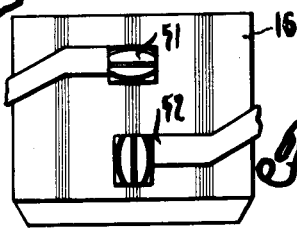
Fig. 23
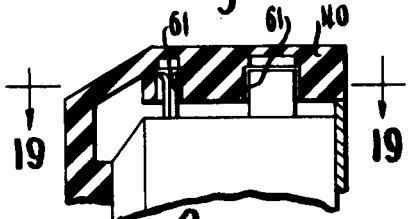
Fig. 20
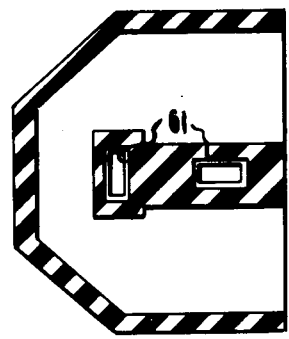
Fig. 18
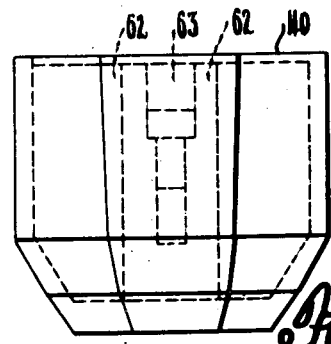
Fig. 21
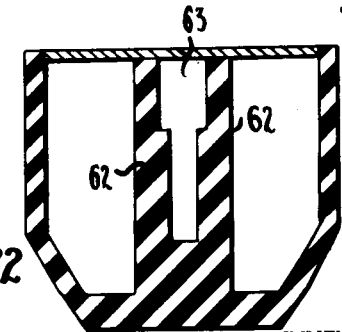
Fig. 22
Fig. 19
INVENTOR.
Harrison J. L. Frank
BY Daniel Kullen
ATTORNEY.

Patented Mar. 2, 1937

2,072,585

UNITED STATES PATENT OFFICE 2,072,585

RANGE RECEPTACLE

Harrison J. L. Frank, Detroit, Mich.

Application June 17, 1935, Serial No. 27,019

1 Claim. (Cl. 247—15)

This application relates to electrical receptacles and discloses a receptacle which is an improvement over the one shown in the patent to Harrison J. L. Frank, 1,995,386, of March 26, 1935, class 247—15.

The receptacle here shown differs from the one disclosed in the patent firstly, in the details of construction of the connectors for the live conductors; and secondly, in the provision of parts by means of which an auxiliary plug outlet may be provided at the top of the receptacle, at the option of the installer. These parts are so designed that they may be added to a standard single outlet receptacle, such as that of the patent, whereby that receptacle may be converted into a duplex outlet receptacle having a main outlet and an auxiliary outlet; and these parts may be added either in the establishment of manufacture of the single outlet receptacle, or at the place of installation of the receptacle, by an installing electrician, merely with the aid of hand tools or the like.

For an understanding of the receptacle here shown reference should be had to the accompanying drawings. In the drawings:

Figs. 1 and 2 are small scale front and side elevational views of the receptacle, with a portion of cable attached;

Figs. 3 and 4 are full scale similar views, but with the covers cut away or in section;

Fig. 5 is a top plan view of the parts of the auxiliary outlet, per se.

Figs. 6—7, 8—9, and 10—11, in pairs, show various modes of physically and electrically associating the conducting straps of the auxiliary outlet with those of the main outlet of the receptacle;

Fig. 12 is a top plan view of the cover of the receptacle.

Fig. 13 is a section on line 13—13, Fig. 12;

Fig. 14 shows an alternative construction of cover;

Figs. 15—17, 18—19, 20—22, and 23 show different modes of properly positioning the contacts of the auxiliary outlet in the receptacle.

Referring to the drawings, it will be seen that the receptacle generally comprises an L-shaped metal bracket 10 having a base 11 and a back 12, the latter being provided with clear holes 14 through which may be passed screws for mounting the bracket against a surface, probably a wall of a room, at or near a base board. Disposed against the back part of the bracket and held thereon by screws 15 tapping into tapped holes of the bracket back 12 is a contact and connection body 16 of molded insulation formed with a base, and with walls providing forwardly and downwardly opening sockets 17, in each of which is secured a double jaw contact 18.

The contacts are mounted on conductor straps 19 provided with cups 20 forming solderless connectors of the type shown in application Serial No. 12,756, filed March 25, 1935, at 70—73. The cups 20 have cross holes 21 and are tapped to receive binding screws 22 having screw driver slots 23, the screws operating to anchor and clamp bared terminal strands 24 of conductors 25 of a line cable 26 and connect these terminals to the contacts 18 through the straps 19.

Covering the bracket entirely and thus concealing all of the interior of the receptacle is a scoop shaped cover 40 having an open back which receives the back 12 of the bracket and an open base which receives the base 11 of the bracket to cooperate therewith and thus form a complete closure for the receptacle. A screw 43 passes through the cover and also through the contact and connection body 16 to hold the cover and the connection body in place, the screws threading into a tapped hole in the back 12 of the bracket.

The cover sides and top are formed to extend to the surface against which the receptacle is mounted and the cover forms a complete seal and closure for the receptacle which is unbroken, because the cover walls extend to the surfaces.

Except for the nature of the connector parts 20—23 for the conductor terminals 24, the parts as heretofore described are similar to those of Patent No. 1,995,386 and, as can readily be observed, provide a main outlet for plug prongs plugged into the contacts 18 through the holes or slots 45 in the front of the cover.

For the purpose of providing an auxiliary outlet for a second plug, like the one shown at 46, Fig. 4, an outlet whose contacts will be accessible from the top of the receptacle, there may be provided an assembly of the character of Fig. 5, the same comprising an insulation plate 50 of V contour upon which are mounted contacts 51 formed upon conductor straps 52 having terminals 53 provided with screws 54, and the top of the cover may be provided with knockouts 55, (Fig. 13), or with holes 56 (Fig. 14). The assembly of Fig. 6, when it is to be used, may be associated with the receptacle by placing the plate 50 upon the top of the body 16, the V contour of the plate cooperating with the V contour of the top of the body to position the plate, and screws 57 may be threaded into tapped holes previously formed, as standard formation, in the top of the receptacle body. Thereafter, terminal screws 54 on the terminals 53 of the straps 52 may be threaded into tapped holes previously formed, as standard formation, in the conducting straps 19 of the receptacle for physically and electrically interconnecting the two pairs of conducting straps, whereupon contacts 51 will be supplied by conductors 25 and will be accessible through the removed knockouts 55 or the holes 56 at the top of the cover.

The association of the auxiliary outlet parts 50—54, 56, with a standard receptacle such as the one of Patent No. 1,995,386 as modified by the provision of knockouts or holes in the cover, and tapped holes in the body for screws 56, and tapped holes in straps 19 for screws 53, may be effected either in the establishment of manufacture or at the place of installation, as can readily be observed.

Other modes of associating the terminals 53 of straps 52 with the conductor terminals 24 may be contemplated and several such other methods are shown in Figs. 7—8, 9—10, and 11—12. Figs. 6—7 show a terminal 52 disposed between a strap 19 and a cup 20 riveted thereto; Figs. 8—9 show a terminal 52 formed with a curved part 52a formed to seat in the cross holes 21 of a cup 20 in which the bared terminal 24 of a conductor 25 is clamped by screw 22, this screw clamping terminals 24 and 52a together and in place; and Figs. 10—11 show a terminal 52 formed with a fork 52b straddling an extension of screw 22 whereby it may be clamped against cup 20 by a nut 22a.

Several modes of properly positioning the contacts 51 in place are contemplated and shown in Figs. 15—23, as alternates to the mode shown in Figs. 3—5, where screws 57 are used.

In Figs. 15—17 the body 16 is formed, in the valley of its top surface, with knobs 60 which restrain sidewise movement of the contacts 51; lifting of the contacts 51 is restrained by the proximity of these to the interior surface of the top of cover 40.

In Figs. 18—19 the cover 40 is formed with pockets 61 in its top, around the knockouts 55 or the holes 56, for receiving the contacts 51.

In Figs. 20—22 the cover 40 is formed with ribs 62 defining between them a groove 63 which seats the contacts 51.

In Fig. 23 the body is formed with ribs 64 which provide grooves receiving the edges of the plate 50 upon which are mounted the contacts 51.

I claim:

A receptacle comprising a box formed of an L-shaped member having a base and a back, and a scoop-shaped cover having a front, a top, and sides, and open at the back and base, these open areas being closed by the member, the member having on its back a contact and connection body at a substantial distance above the member base to leave the lower part of the box clear so as to facilitate insertion of a conductor terminal into the box through a lower part of the member, plug prong receiving contacts on the body opening towards the front of the box, a unit so constructed as to be associatable with or removable from the body as a unit and comprising a mounting plate for the unit dimensioned complementary to the top of the body to fit and seat on the top thereof properly, the plate being seated on the top of the body, plug prong receiving contacts on and secured to the plate and projecting therefrom towards and opening towards the top of the box, plug prong entrance holes in the front of the cover, and plug prong entrance holes in the top of the cover, these holes being aligned with the corresponding contacts of the body, and conductor terminal binding means on the body for receiving upwardly projecting terminals of conductors inserted into the box through the lower part of the same, the plate contacts having portions secured and connected to the connecting means of the body contacts for securing the unit on the body and for electrically connecting the unit contacts to the body contacts.

HARRISON J. L. FRANK.